United States Patent [19]

Schossow

[11] 4,028,526

[45] June 7, 1977

[54] ELECTRICALLY GROUNDED VAPORIZER STRUCTURE

[76] Inventor: George W. Schossow, 2316 Lilac Lane, White Bear Lake, Minn. 55110

[22] Filed: Feb. 21, 1974

[21] Appl. No.: 444,337

Related U.S. Application Data

[63] Continuation-in-part of Ser. No. 832,279, June 11, 1969, Pat. No. 3,809,374.

[52] U.S. Cl. .................... 219/295; 21/119; 128/192; 219/272; 219/292; 219/362; 261/142; 361/50

[51] Int. Cl.² ............... H05B 1/02; H05B 3/60; H02H 1/02; F22B 1/30

[58] Field of Search .......... 219/284–295, 219/271–276, 362; 317/9 A, 18 A, 18 B; 128/186, 187, 192, 193; 21/117–119; 261/142, 130

[56] References Cited

UNITED STATES PATENTS

| 1,483,280 | 2/1924 | Cherry | 219/288 X |
|---|---|---|---|
| 1,734,335 | 11/1929 | Martin et al. | 219/289 |
| 1,987,381 | 1/1935 | Twombly | 219/288 |
| 1,994,331 | 3/1935 | Ziskin et al. | 219/292 |
| 2,140,516 | 12/1938 | Cowan | 219/274 |
| 2,519,515 | 8/1950 | Turner | 219/274 |
| 2,533,794 | 12/1950 | Hanks et al. | 219/275 |
| 2,777,935 | 1/1957 | Schmitt et al. | 219/275 X |
| 3,365,181 | 1/1968 | Schwaneke | 219/362 X |
| 3,714,517 | 1/1973 | Stracek | 317/18 B |
| 3,892,945 | 7/1975 | Lerner | 219/295 X |

Primary Examiner—A. Bartis
Attorney, Agent, or Firm—John C. Barnes

[57] ABSTRACT

A vaporizer having an improved electrode-type steam generator structure to control the amount of steam generated and to maintain the power requirements for generating the steam constant. The generator is particularly adapted for portable room humidifiers where the steam is generated in a confined chamber within a large reservoir of water. The generator comprises a pair of concentric electrodes disposed in the bottom of the steam chamber. The surface areas of the electrodes are in spaced relationship and a perforate cap is placed over the electrodes or the radially outer electrode is an inverted cup-shaped member the end of which is perforated to determine the amount of steam which is allowed to escape off of the electrodes. A fan mixes the steam with air and the unit is provided with an electrical circuit to prevent shocks from the unit and to prevent operation without a properly wired and grounded outlet.

16 Claims, 7 Drawing Figures

ELECTRICALLY GROUNDED VAPORIZER STRUCTURE

RELATED APPLICATION

This application is a continuation-in-part of Ser. No. 832,279, filed June 11, 1969, now U.S. Pat. No. 3,809,374.

BACKGROUND OF THE INVENTION

This invention relates to an improvement in electrode type vaporizers and in one aspect to an improved team generating head, suitably wired and grounded to reduce the hazards existing in present steam vaporizers.

DESCRIPTION OF THE PRIOR ART

Prior known steam generators of the electrode type have been commercially popular but all known types have been hazardous causing electrical shocks, team burns and scalds by the hot water. The prior known steam generators are illustrated in prior art patents such as U.S. Pat. No. 2,140,516, issued Dec. 20, 1938, to Cowan; and U.S. Pat. No. 3,420,509, issued Jan. 7, 1969 to Katzman et al. These patents utilize the electrode-type of steam generating head for the humidifier. The use of opposed electrodes to produce the steam causes the insoluble minerals left in the water after generation of the steam to collect and form scale in the chamber, plugging the holes and the soluble minerals cause current to flow through the water between the electrodes. As the amount of soluble minerals increase there is an increase in the conductivity of the water. This increased conductivity increases the amount of current drawn in the continued generation of the steam. The increase in current i.e. amperage, causes an increase in the amount of steam generated. The amount of conductive surface on the opposed immersed electrodes also controls the amount of steam generated. Therefore, even though the amount of water over the electrodes may decrease as the concentration of electrolytes increase there is no control of the steam output in these prior systems. Output is based solely on concentration of electrolytes in the water and the amount of water.

The humidifier of U.S. Pat. No. 2,140,516 is of the electrode type but the porous low resistance electrodes are confined on opposite surfaces of a cylindrical spacer wick, which wick would eventually plug up with the deposits from the minerals remaining after the moisture within the wick is heated and vaporized. There is no open path between these electrodes such that the steam generation or vapor pressure of the steam within the boiling chamber or well 24 will have any affect on the water between the electrodes or on the purged minerals to clean the electrodes. The amount of water admitted through the one-way valve will vary as the height of the water in the reservoir decreases and that is the only control provided.

The steam generator of the type disclosed in U.S. Pat. No. 2,847,547, issued Aug. 12, 1958 to Gordon utilizes the vapor pressure to maintain a constant level of water within the vapor chamber 2 and not a controlled steam release. This teaching of using a vapor pressure for maintaining the water level over an immersion heater does not teach the present invention nor is the use of a circular immersion heater a teaching to one skilled in the art to utilize circular electrodes within a container, which container is formed to control steam generation and maintain a controlled power requirement as taught by the invention described in this application.

U.S. Pat. No. 3,267,678, issued Aug. 23, 1966 to Camp, utilizes a capillary tube of a predetermined dimension to control the flow rate of water into a steam generator and for thermally and hydrostatically isolating the steam generator. Steam generation thus relies on a hydrostatic head and is controlled thereby.

The vaporizer currently marketed by Campillary Systems Inc. of Port Chester, N. Y. 10573 utilizes a steam generating chamber disposed in a reservoir and having a small opening at the bottom allowing water to enter at a rate controlled by the steam pressure developed in the chamber by the electrodes. Since the steam output is restricted by a smaller outlet in the top of the steam chamber the steam pressure controls the water input but it is variable since a higher hydrostatic head increases the pressure in the chamber and the increased pressure increases the amount of steam discharged and the length of the jet of steam discharged from the discharge outlet. The jet of steam is hazardous and may burn someone. Further, the increased pressure causes the jet of steam to include occasional sprays or droplets of hot water.

The electrode devices have a further disadvantage in that an electrical leak is produced from the steam chamber by electrically charged water being purged through the inlet opening which is hazardous when the current is carried through the mineralized water. This provides a shock hazard if one places a hand in the reservoir water because this electrical current is freely transferred through the current conducting electrolyte solution. This hazard is consistently brought out by consumer protective publications and electrode heaters are consistently condemned because of this problem. No known vaporizer is produced to eliminate the potential of this hazard.

Further, the boiling chambers with small openings prevent the boiling liquid from escaping when the chamber is separated from the reservoir. This is due to the fact that the small inlet opening restricts the prompt discharge of the water. If the dripping water is allowed to drop onto one's skin a burn may result.

In addition, the prior known humidifiers or vaporizers are void of any teaching of placing an additional neutral wire in the steam chamber or to surround the boiling chamber to prevent shocks by carrying away any charge.

Therefore, an improvement in design to produce a vaporizer which will discharge clean vapor and avoid burns, electrical shock, or variations in steam output during the vaporization of a reservoir of water is the subject of applicant's invention. The structure to avoid the discharge of a jet of scalding steam and to avoid possible contact with hot water from the boiling chamber upon separating the vaporizer members is claimed in copending application Ser. No. 832,279, filed June 11, 1969 now U.S. Pat. No. 3,809,374.

The present invention is directed at a novel structure for cleaning the electrodes, controlling the discharge of steam from an electrode type heating system, restricting the possibility of electrical shock, removing the possibility of the development of a steam chamber which may become hazardous by the plugging of any restricted outlet, and restricting the possible use of the device where there is not a properly grounded outlet.

SUMMARY OF THE PRESENT INVENTION

A room-type vaporizer constructed in accordance with the present invention provides for constant steam output at a current or energy level which is continuous after the device starts to generate steam. The structure of the device further provides for a cleaning action on the electrodes to avoid a concentration of minerals between the electrodes as the amount of water in the reservoir is diminished. The device is constructed such that the clean (mineral and germ free) vapor released from the vaporization chamber is mixed with room air drawn into the humidifier and a cooled moist vapor or "cool steam" is discharged. The electrode-type vaporizing head comprises a pair of arcuate electrodes in the form of coaxial, opposed cylindrical rings which are positioned to place the outer cylindrical surface of one ring in opposed relationship to the inner cylindrical surface of the other. The electrodes are positioned near the bottom of the vaporization or boiling chamber.

The invention further provides means for controlling the amount of steam which is generated or permitted to escape from between the electrodes. The steam limiting structure is provided by enclosing the electrodes in an inverted cup like member having control means defined by a predetermined number of holes of a given size to permit the steam to escape. In the preferred embodiment the outer electrode is an inverted stainless steel cup positioned about the inner electrode, which cup has a plurality of holes in the end wall positioned above the electrodes. The number and size of the holes determines the amount of steam which may be allowed to escape. This may be preset to maintain a predetermined output or means may be provided to vary the output such that the number of openings in the member may be increased by moving a telescopically supported perforate member to various positions relative to a fixed cylindrical wall or to the wall of the outer electrode. The telescopic movement will expose a greater number of holes or a fewer number of holes to respectively increase or decrease the amount of steam which is allowed to escape. The cup with the holes provides a steam generator within the boiling chamber.

A fan positioned directly above the boiling chamber draws the steam from the generator into a stream of air which is pulled into the reservoir surrounding the boiling chamber such that the steam is mixed with the ambient room air and is expelled with sufficient air that the steam is cooled below a scalding temperature.

The appliance of this invention has an electrical circuit including an energizable switching means connected to the electrodes and to the fan to prevent operation of the device without a suitable third wire earth ground or without water in the boiling chamber. The circuit also dissipates any charge in the reservoir water to prevent electrical shock from a charge buildup in the water of the supply reservoir or an electrical leak through the water. This novel circuit will also assure the presence of a properly wired and grounded electrical receptacle to which the device is connected by a three wire cord.

DESCRIPTION OF THE DRAWING

The present invention will be more fully understood after reading the following detailed description which refers to the accompanying drawing wherein.

DESCRIPTION OF THE PREFERRED EMBODIMENT

Figure 1:
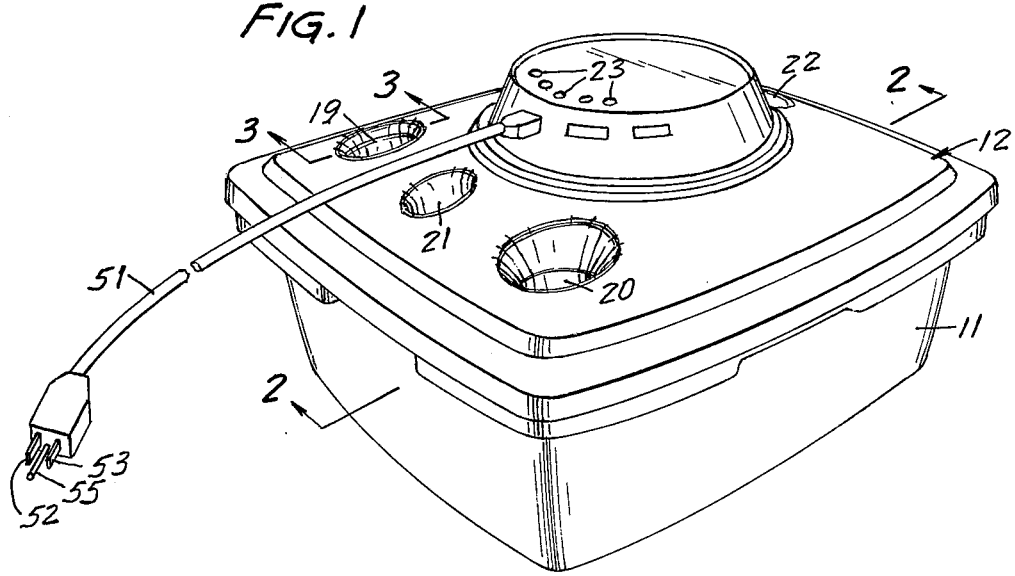
FIG. 1 is a perspective view of a vaporizer structure constructed according to the present invention.
Figure 2:
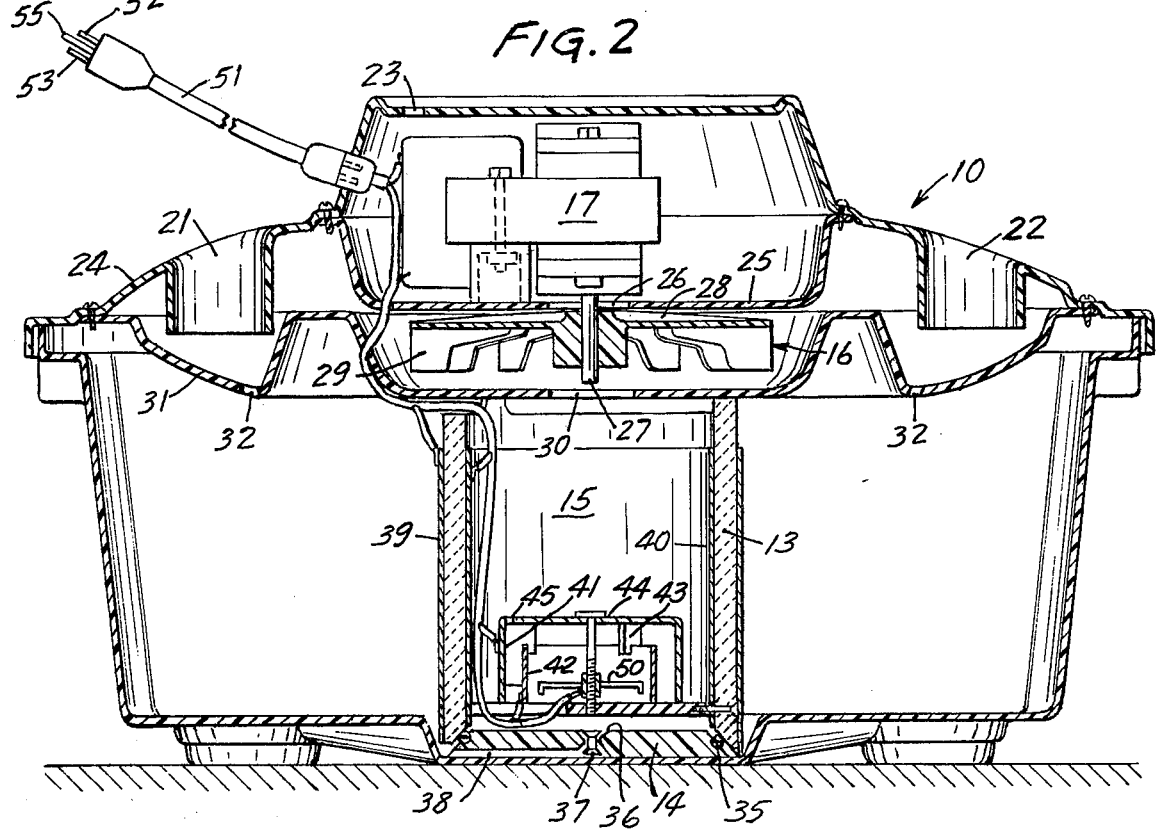
FIG. 2 is a vertical sectional view taken along the lines 2—2 of FIG. 1.

The vaporizer 10, illustrated in FIG. 1 comprises a molded base 11, of trapeizoid shape in plan which forms the reservoir for the water, and a cover 12. The cover 12 is formed to mate and be supported on the upper edge of the base 11. A hollow cylindrical insulative tubular wall member 13 together with a mating plate or disk 14 supported in the base 11 define a vaporization or boiling chamber 15. The cylinder 13 is secured to and is supported by the cover 12 and the disk 14 is preferably removably secured to the base 11. The boiling chamber is formed when the cover is placed on the base. A fan or blower 16 is supported in a manifold formed in the cover directly above the boiling chamber 15. The fan 16 is driven by a motor 17 supported in the cover. Steam is generated in the boiling chamber 15, and, as the same is generated, the blower 16 mixes the steam with room air which has been drawn into the base through inlet openings 19 and 20. The mixed steam and air is expelled through vapor discharge openings 21 and 22 in the cover 12 leading out of the manifold.

Figure 3:
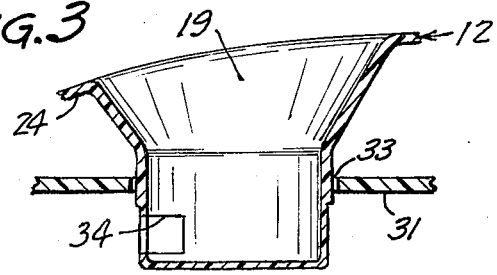
FIG. 3 is a vertical sectional view taken along the lines 3—3 of FIG. 1.

The cover 12 comprises a molded main shell 24 in which is formed cylindrical walls defining the openings 19, 20, 21 and 22, and part of the motor housing in which is formed air holes 23 permitting air into the motor housing. The remainder of the motor housing is formed by a molded dish 25 having an opening 26 through which extends the motor drive shaft 27 which supports the fan 16. Fan 16 has vanes 28 on the top surface to draw air through holes 23 into the motor housing and out through opening 26. Vanes 29 on the fan 16 draw air and steam through an opening 30 in a lower cover plate 31. The cover plate 31 encloses the fan 16 and forms the manifold chamber with shell 24 through which the mixture of steam and air is forced to the discharge openings 21 and 22. The plate 31 has holes 32 permitting any condensation to run back into the base reservoir and openings 33 through which extend the cylindrical walls forming inlet openings 19 and 20 (FIG. 3). The air inlets communicate directly with the base. The walls forming the inlet openings 19 and 20 have a closed end and apertures 34 in the side walls below the plate 31. This prevents objects from being dropped into the reservoir. Inlet openings could alternatively be formed in the base above the normal water level or air could enter between the cover and the base. The amount of air permitted to enter the base, with a given size fan, determines the temperature of the air/steam (cool steam) discharged.

The boiling chamber 15 is formed when the cylindrical wall 13 is in abutting mating engagement with the disk 14 supported in a central portion of the bottom wall of the base 11. The top of cylindrical wall 13 is secured to the cover plate 31 coaxially with the opening 30. The disk 14 is formed of an insulating material and preferably is releasably secured to the base 11 to permit the disk and bottom wall of the base to be cleaned. The disk 14 is circular and relatively thin with beveled edges grooved to support an O-ring 35 of circular cross-section. The disk 14 also has a central opening 36 in which is placed a one-way check valve 37 to restrict the flow of water from the boiling chamber into the base. The opening 36 communicates with the reservoir of the base via a passageway 38 or by the disk being supported in spaced relationship to the bottom wall of the base. The check valve 37 is in the form of a bolt having a head to seal in the countersunk portion of the opening 36 and gravity or pressure inside the boiling chamber will close it to allow water to flow in and restrict the flow of hot water out of the boiling chamber into the surrounding storage reservoir.

The cylinder 13 forming the boiling chamber is affixed to the underside of the cover plate 31 and is chamfered on the lower or free end to mate with the peripheral beveled edge of the disk 14 and seal on the O-ring 35. The outer surface of the hollow cylinder 13 is covered or coated by a conductive metal layer 39 and a conductive metal layer 40 is formed about the inner cylindrical wall from a position near the bottom of the boiling chamber to a position spaced slightly from the top of the cylinder. The function of the conductive coatings or layers 39 and 40 will be discussed in more detail later in the description. The layers 39 and 40 may be conductive rings, layers of a metal foil or a vapor coating of conductive material. The cylinder 13 is supported by at least three posts or projections in spaced relationship from the plate 31 about the opening 30 to permit air to enter at the top of the boiling chamber 15 and mix with steam developed therein.

The steam is generated by heating the water between a pair of electrodes 41 and 42 supported by spacing, insulative members 43 in the lower part of the chamber 15 adjacent the disk 14. The electrodes 41 and 42 illustrated are cylindrical rings of different radius positioned in coaxially opposed spaced relation such that the outer surface of the small ring 42 is in opposed spaced position to the inner surface of the larger ring 41 to permit the heating of the water by its electrical resistance. As illustrated the electrode 41 has a larger axial dimension than the electrode 42. This increased length permits it to support an end wall 44 spaced from electrode 42 and forming thereby an inverted cup enclosing the electrode 42. The end wall 44 is formed with control means illustrated as a plurality of openings 45 which have a predetermined size and number and control the amount of steam which is allowed to escape from between the electrodes. The small openings let the steam within the electrode 41 escape without excessive agitation of the water in the boiling chamber above the electrode 41. The bubbles of steam then escape from the electrode 41 and as the steam builds up in the electrode above the amount allowed to escape it forces the water level within the inverted cup down toward the disk 14. Means may be provided to adjust the size or number of holes exposed to control or adjust the amount of steam generated. Such adjustment may be provided by telescoping walls of the electrode 41 or by relatively rotatable disks forming the end wall 44 both of which disks would have openings and would thus adjust the size or number of openings.

As the water is boiled between the annular electrodes and steam is produced, the steam pressure is produced in surges developing downward pressure between the electrodes tending to cause movement of the water between the electrodes which has a desirable cleaning effect on the opposed surfaces and retards scale buildup.

Figure 5:
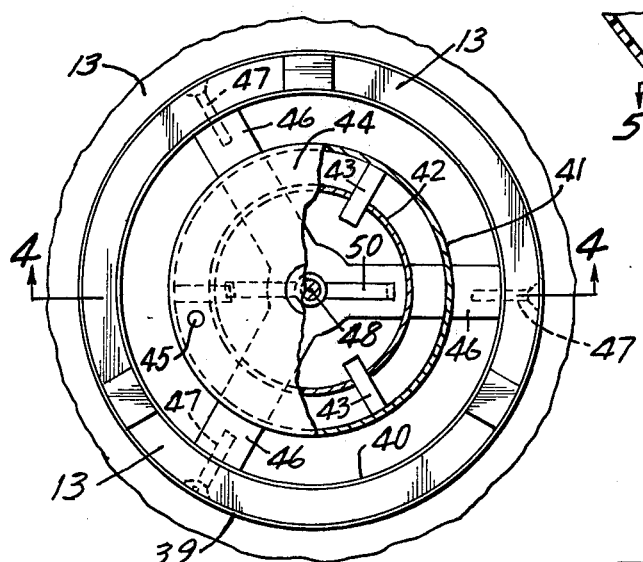
FIG. 5 is a top view of the boiling chamber taken along lines 5—5 of FIG. 4.
Figure 4:
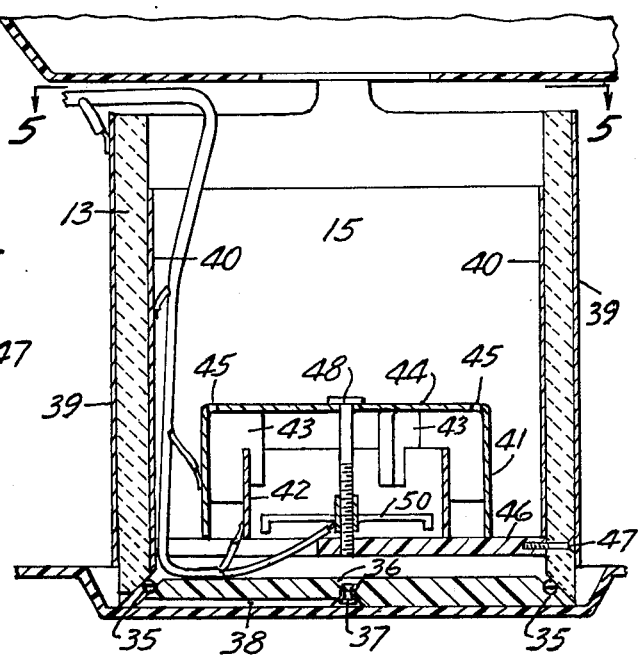
FIG. 4 is an enlarged fragmentary vertical sectional view of the boiling chamber.

As shown in FIGS. 4 and 5 the electrodes are supported in a central position in the boiling chamber 15 by an insulative three-spoked support member 46 held by plastic or nonconductive fasteners 47 on the cylinder 13. A nonconductive bolt 48 and the spacers 43 hold the electrodes on the support 46 and the bolt 48 supports a conductive bar 50 which is positioned in closely spaced position above the support member 46.

The vaporizer is provided with a novel safety circuit to prevent shock and to assume operation only when connected to a properly wired and grounded outlet. The circuit has a momentary "on" switch to energize a switching hold-in circuit which is energized initially by the ground line.

Figure 6:
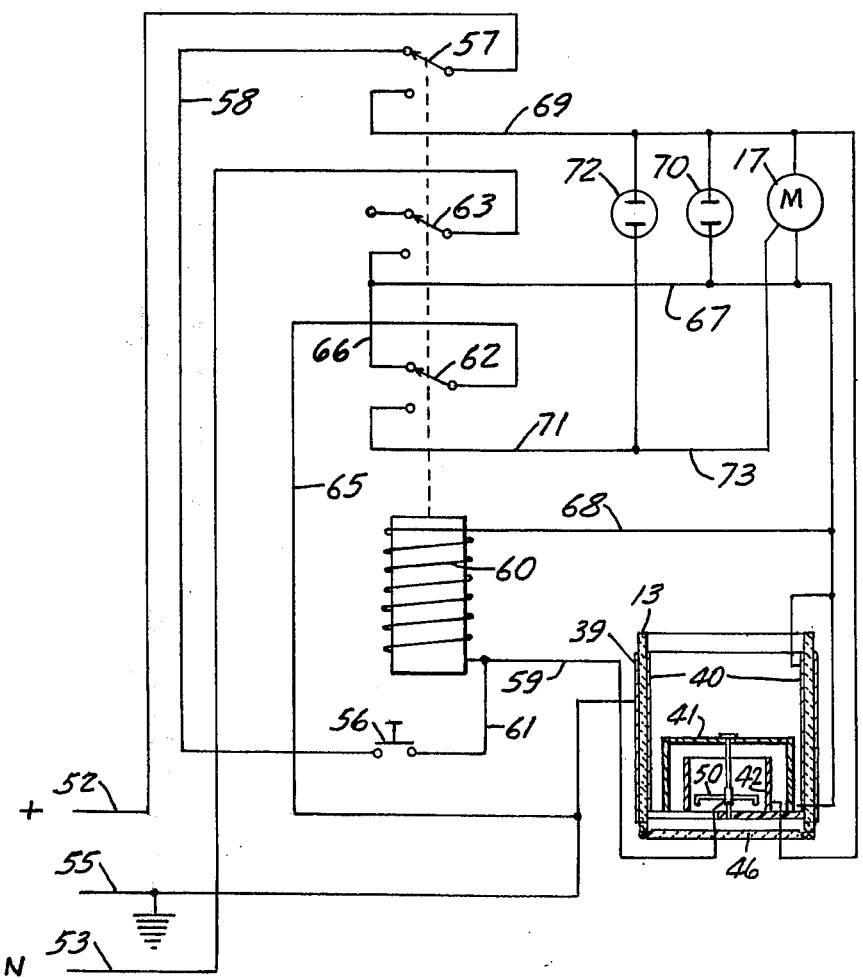
FIG. 6 is a schematic wiring diagram.

A three wire cord 51 is connected to the vaporizer 10 and as shown in FIG. 6 comprises the hot nonground (+) conductor 52, the neutral conductor 53 and earth ground conductor 55. The vaporizer is placed in operation by a push button or momentary contact switch 56 placed in the hot line. The hot line 52 is connected directly to a first double throw relay switch 57 and a line 58 joins the switch 57 to the switch 56. The other side of switch 56 is connected to the coil 60 of the switch relay or to some other switch actuating means via a line 61. The line 61 and relay coil 60 are also connected via line 59 to the conductive bar 50 such that the switch actuating means is held in or energized when there is current flowing across the gap to the conductive bar 50. The switch actuating coil 60 is energized initially through a second double throw switch 62 connected to the ground line 55 via lead 65 and to the relay coil via line 66, and a normally neutral line 67 leading to the electrode 41 and metal layer 40, and line 68. Neutral line 53 is initially open and is connected to a third double throw relay switch 63. If the outlet is not properly grounded or not provided with a ground line the vaporizer will not and cannot be energized when the switch 56 is closed. If there is a proper ground which is connected to the layer 39 and switch 62 then closing switch 56 causes current flow through hot line 52, switch 57, line 58, switch 56, line 61, coil 60, lines 68, 67, 65 and ground line 55 to actuate the switch actuating device. Thus, the switch actuating device will cause a switching of switches 57, 62 and 63 from the normal positions shown to their alternate position.

Switch 57 shifts the (hot (+)) line to a line 69 to energize the motor 17 and the inner electrode 42. The presence of water in the vaporization chamber 15 allows current from the hot electrode to be carried across the gap to the bar 50 and via line 59 to the relay coil 60. Bar 50 and the line 59 and line 68 thus hold the switches closed. Line 69 will also energize an "on" red neon lamp 70 as switch 63 closes the neutral path from line 53 to line 67. Switch 62 shifts the ground line 65 to a lead 71 directed to a green lamp 72 which indicates the vaporizer is suitably grounded. If the vaporizer runs out of water and the conductive path from electrode 42 to the bar 50 is opened the switch actuating device (coil 60) is de-energized or triggered to return the switches 57, 62 and 63 to their normal position and the motor 17 is de-energized and the electrodes are no longer joined to the current source. The chassis of the motor 17 is joined to the ground line 71 via a line 73.

Figure 7:
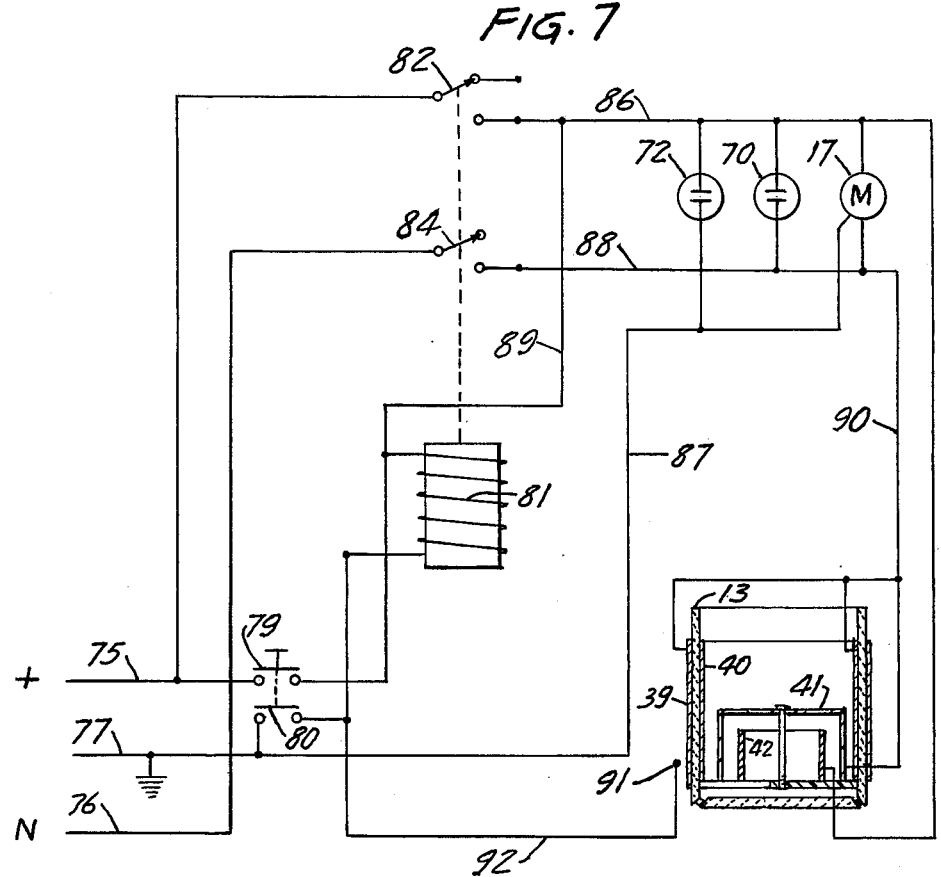
FIG. 7 is a schematic wiring diagram showing a second embodiment.

An alternative circuit for the motor 17, lamps 70, 72, electrodes 41 and 42, and in this embodiment the layers 39 and 40, are joined and both are coupled to the electrode 41, as shown in FIG. 7. The cord 51 contains a hot (+) line 75, a nuetral line 76 and a ground line 77. The line 75 is connected to one blade 79 of a double pole momentary contact switch and ground line 77 is connected to the other blade 80. Closing this switch momentarily will energize a switch actuating member or relay coil 81. The relay coil will, if a ground was provided at the outlet, close a pair of normally open switches 82 and 84. Switch 82 when closed will connect a line 86 to hot line 75 to energize the motor 17, "on" lamp 70, the electrode 42 and via a line 89 will connect the hot (+) line to the coil 81. Switch 84 is connected to neutral line 76 and when closed will connect the line 76 to line 88 which is connected to the lamp 70 and to the motor 17. Line 88 is also connected via line 90 to the electrode 41 and to the conductive layers 39 and 40. In this embodiment a water level sensor and turn-off means is provided by an exposed sensing contact 91 supported on the cylinder 13 in spaced relation to the layer 39 which is connected to the neutral line. The sensor 91 is connected by a line 92 to the coil 81. When switch 84 is closed and water is in the reservoir the gap between sensor 91 and the coating 39 is closed and the relay switches 84 and 82 are held closed.

In the event there is neither a proper ground initially at the outlet or no water in the base 11 covering the sensor 91, closing switch blades 79 and 80 will not energize the relay coil 81. If there is a proper ground but no water, the switches 82, 84 will not remain closed. A properly wired outlet will have the hot wire to the right or counterclockwise from the ground receptacle. If the outlet is improperly wired with the hot wire and neutral reversed relative to the ground the switching device will not be energized and there will not be any electrical activity.

If ground potential is present on line 77 and water in the base covers the sensor 91, closing switches 79, 80 energizes coil 81 switching the position of contacts 82 and 84. The switches 79, 80 can then be released and current passing through the line 75, switch 82, line 86, line 89, coil 81, line 92, sensor 91, the water, conductive layer 39, line 90, line 88, switch 84 and neutral line 76 maintain the circuit closed for the fan motor 17 and electrodes 41 and 42. When all the water is boiled away above sensor 91 the circuit opens through the coil and as a result switches 82 and 84 are opened.

The coated layers 39 and 40 serve to neutralize the water about the electrodes and to neutralize the water in the reservoir surrounding the boiling chamber. This neutralization of any charge in the water or the possibility of current moving through the water to another object is controlled by the presence of the earth ground 55 connected to coating 39 or the neutral conductor 90 being connected to coating 39. These circuits avoid possible shocks from contact with the water while the electrodes are providing a potential therebetween.

The vaporizer 10 constructed according to the present invention will provide a controlled, cool, clean steam generator with a constant output. Steam generation from the enclosed electrodes is controlled by the rate of its own steam generation to make the output uniform. Important also is that the device will be safe from electrical shock and will shut off automatically when all the water is boiled away, when the cover is lifted off the base, when the unit is accidently tipped over, or when there is an interruption in the electrical power supply. This electrode vaporizer with the controlled output and automatic shutoff thus has all the benefits of an immersion heater vaporizer with a thermostat. The ground energized relay or the switching device can be a comparable solid state switching device as is well known in the art.

Having described the present invention with reference to an illustrated embodiment and with the description of several modifications thereof, it should be understood that other modifications can be made without departing from the spirit of the invention as defined in the appended claims.

I claim:

1. A vaporizer for vaporizing water to steam and mixing the steam with air and dispensing a moist air below scalding temperature, said vaporizer comprising
a base defining a reservoir for liquid,
a plate supported in said base,
a cover supported on said base, said cover supporting a tubular member which has one end joined in abutting mating engagement with said plate to form a boiling chamber, an electrically driven fan supported in a manifold within said cover and in communication with the base and the boiling chamber to draw steam from said boiling chamber and air from said base into said manifold to be discharged therefrom through a discharge outlet, valve means permitting water to flow from said reservoir to said boiling chamber, and electrode heating means disposed in said boiling chamber to boil the water therein by electrical resistance of the water, and
an electrical circuit for energizing said electrode heating means and said fan, said circuit including a ground line for providing ground potential, an electrically energizable switching means for connecting said fan and the electrodes of said electrode heating means to a source of potential through a hot and neutral line respectively, a momentary contact switch connected in series with said hot line and said switching means for energizing said switching means, said circuit for said switching means, momentary contact switch, hot line and ground line being such that said switching means can be energized by said momentary contact switch only when ground potential is present to said circuit via said ground line, and a sensing member connected in series with said switching means and positioned in said base adjacent one of an element of said boiling chamber carrying current and an electrode of said electrode heating means disposed in said base to close said circuit including said switching means for holding said switching means energized only when there is water in said base above a predetermined minimum level to cover said sensing member for holding said fan and electrode heating means energized.

2. A vaporizer according to claim 1 wherein said sensing member is in adjacent spaced relationship from one of said electrodes of said electrode heating means.

3. A vaporizer according to claim 1 wherein said sensing member is in adjacent spaced relationship to the hot electrode of said electrode heating means.

4. A vaporizer according to claim 1 wherein a conductive member is positioned on the outer surface of the walls of said tubular member which is electrically insulating and said outer conductive member is connected to one of the neutral line and the ground line.

5. A vaporizer according to claim 4 wherein said conductive member about said outer wall surface is connected to the ground line.

6. A vaporizer according to claim 1 wherein said electrode heating means comprise coaxial cylindrical rings and means are provided to enclose the inner ring and space between said rings for controlling the generation of steam.

7. A vaporizer according to claim 6 wherein conductive members are positioned on the outer and inner surfaces of the walls of said tubular member which is electrically insulative and that said conductive members are each connected to one of the neutral and ground lines to reduce any potential build up and restrict any potential shock from the energized electrodes.

8. A vaporizer according to claim 7 wherein said sensing member is positioned adjacent said element of said boiling chamber and said element is the outer conductive member and said outer conductive member is connected to said neutral line and is disposed on an area of said outer wall of said tubular member and extends to a position in said base below the level of said sensing member.

9. A vaporizer according to claim 7 wherein said sensing member is positioned in spaced relation to the inner ring and said inner ring is connected to the hot line and is positioned in the base and extends to a position in said base below the sensing member.

10. A vaporizer according to claim 9 wherein said outer conductive member is connected to the ground line.

11. A vaporizer according to claim 7 wherein said conductive member on the outer surface of said tubular member is connected to the neutral line and is said element of the boiling chamber, and said sensing member is positioned in spaced relation to said outer surface and said conductive member.

12. A vaporizer according to claim 1 wherein said momentary contact switch is connected in series with the ground line.

13. A vaporizer according to claim 12 wherein said momentary contact switch includes a switch blade connected to said switching means and said hot line to energize said switching means.

14. A vaporizer according to claim 1 wherein said sensing member is positioned adjacent an electrode of said electrode heating means connected to the hot line and said momentary contact switch is in a hot line connected to said switching means on the same side thereof as said sensing means.

15. A vaporizer according to claim 1 wherein said switching means is a relay and operates at least a pair of switch members to close said hot line and said neutral line to close a circuit including said fan and said electrodes of said electrode heating means.

16. A vaorizer according to claim 1 wherein said electrode heating means comprises a pair of cylindrical electrodes one of which has a diameter greater than the other to surround the other electrode in spaced relationship and an axial dimension greater than that of the other electrode, and an end wall closing the end of said one electrode above said other electrode and the space therebetween, said end wall trapping steam in the space between the cylindrical electrodes, said end wall having openings to permit controlled escape of steam from the space whereby the steam generated will control the rate of further steam generation.

* * * * *